United States Patent [19]

Perkin et al.

[11] Patent Number: 5,360,967
[45] Date of Patent: * Nov. 1, 1994

[54] OILFIELD EQUIPMENT IDENTIFICATION APPARATUS

[76] Inventors: Gregg S. Perkin, 2218 North Park Dr., Kingwood, Tex. 77339; Lawrence A. Denny, 2200 Jamie Dr., Oklahoma City, Okla. 73170

[*] Notice: The portion of the term of this patent subsequent to Aug. 25, 2009 has been disclaimed.

[21] Appl. No.: 111,781
[22] Filed: Aug. 25, 1993

Related U.S. Application Data

[63] Continuation of Ser. No. 902,070, Jun. 22, 1992, abandoned, which is a continuation of Ser. No. 518,973, May 4, 1990, Pat. No. 5,142,128.

[51] Int. Cl.⁵ .............................................. G06K 7/00
[52] U.S. Cl. ..................................................... 235/375
[58] Field of Search ...................................... 235/375, 385

[56] References Cited

U.S. PATENT DOCUMENTS

| | | | |
|---|---|---|---|
| 4,202,490 | 5/1980 | Gunkel | 235/449 |
| 4,497,029 | 1/1985 | Kiyokawa | 364/474 |
| 4,533,823 | 8/1985 | Vittorio | 235/375 |
| 4,569,421 | 2/1986 | Sandstadt | 186/39 |
| 4,578,991 | 4/1986 | Nowlin | 175/40 |
| 4,616,322 | 10/1986 | Niwa | 364/474 |
| 4,628,458 | 12/1986 | Ohta et al. | 364/474 |
| 4,720,626 | 1/1988 | Nishikawa et al. | 235/449 |
| 4,742,470 | 5/1988 | Juengel | 364/474 |
| 4,780,599 | 10/1988 | Baus | 235/385 |
| 4,818,855 | 4/1989 | Mongeon et al. | 235/449 |
| 4,850,009 | 7/1989 | Zook et al. | 379/96 |
| 5,099,227 | 3/1992 | Geiszler et al. | 340/572 |
| 5,099,437 | 3/1992 | Weber | 364/550 |
| 5,142,128 | 8/1992 | Perkin et al. | 235/375 |
| 5,157,687 | 10/1992 | Tymes | 235/385 |
| 5,221,831 | 6/1993 | Geiszler | 235/440 |
| 5,225,996 | 7/1993 | Weber | 364/550 |
| 5,698,631 | 10/1987 | Kelly, Jr. | 340/853 |

FOREIGN PATENT DOCUMENTS

WO93/15561 1/1993 WIPO.

OTHER PUBLICATIONS

Translation of German Publication Hans-Peter Schneider, Keike Rüter, "Electronic Tool Identification Card," VDt-Z vol. 128 (1986) No. 19 Oct. (1), pp. 1–11.
German publication—"Elektronische Werkzeug-Kennkarte" VDI-Z Bd. 128 (1986) Nr. 19–Oct. (1).

Primary Examiner—Richard A. Rosenberger
Attorney, Agent, or Firm—Pravel, Hewitt, Kimball & Krieger

[57] ABSTRACT

An apparatus for identifying equipment, including the maintenance of usage histories for the equipment and recommending whether the equipment is to be used in a prospective application based on prospective application and usage history. A portable encapsulated passive circuit capable of transmitting an identification code is affixed to a piece of equipment. The circuit is activated by a portable reader which receives and decodes the identification code and transmits it to a central computer. The central computer verifies the reader and the existence of the equipment in a database and retrieves the usage history for the equipment. Based on the usage history, the prospective application and guidelines for usage of equipment, the computer determines the advisability of using the equipment in the prospective application and transmits the recommendation back to the portable reader.

5 Claims, 9 Drawing Sheets

OILFIELD EQUIPMENT IDENTIFICATION APPARATUS

This application is a continuation of U.S. patent application Ser. No. 07/902,070, filed Jun. 22, 1992, now abandoned, which is a continuation of U.S. patent application Ser. No. 518,973, filed May 4, 1990, now U.S. Pat. No. 5,142,128.

SPECIFICATION

BACKGROUND OF THE INVENTION

The present invention is related to the field of remote identification devices, in particular, the remote identification and maintenance of service records for various pieces of downhole and surface oilfield equipment.

1. Field of the Invention

The present invention relates generally to the field of identifying downhole and surface oilfield equipment for the purposes of maintaining usage records for such equipment.

2. Background of the Invention

The exploration, development and completion of an oil or gas field requires numerous pieces of equipment and materials such as casing, drill pipe, packers and other equipment. The cost of this equipment is relatively high. Accordingly, it is desirable to reuse many pieces of equipment for subsequent drilling and development operations. However, equipment undergoes considerable stress during drilling and completion operations. Components such as drill pipe may suffer from material fatigue which may ultimately result in failure of the drill pipe. The failure of a joint of drill pipe when downhole will require a suspension of drilling operations to recover the remainder of the drill string and other related equipment. It will be appreciated that the recovery of a drill string can be an expensive and time-consuming operation. Accordingly, it is desirable to maintain a service record relating to various pieces of equipment, such as drill pipe, for the purposes of determining fatigue and other factors relating to the use of equipment.

A number of methods have been utilized in an attempt to track service time information relating to pieces of oilfield equipment. U.S. Pat. No. 4,578,991 discloses a means for identifying drill pipe utilizing concentric rings of ferrous and non-ferrous material to create an identification code for the particular piece of drill pipe and a sensing means which detects the bands as the drill pipe passes the sensing means. The method disclosed therein suffers from limitations in the identification system in that only so many concentric rings may be mounted on any one length of drill pipe. Further, the disclosure calls for a stationary detector.

U.S. Pat. No. 4,061,967 also disclosed a means of identifying drill pipe utilizing a stationary electromagnetic detector "shoe" which sensed magnetic and non-magnetic inserts placed on the periphery of a tool joint pipe. However, the system disclosed therein required that the pipe be identified as it traversed the detector on its way downhole. It will be appreciated that in order to remove a joint of drill pipe which has exceeded its nominal service time, the joint will have to be uncoupled from the remainder of the drill pipe string. U.S. Pat. No. 4,202,490 also disclosed a similar identification system also utilizing magnetic and non-magnetic inserts dispersed around the periphery of a pipe joint and a detecting coil. This disclosure suffers from the same problems as U.S. Pat. No. 4,061,967.

SUMMARY OF THE INVENTION

The present invention provides for a new apparatus for identifying various pieces of oilfield equipment, maintaining usage information relating to the equipment and generating recommendations relating to the use of a piece of oilfield equipment with respect to a prospective use. The present invention includes a portable reader which is capable of identifying the equipment away from the immediate job site. This permits the user to identify the equipment and determine the advisability of using the particular piece of-equipment in advance of it being transported to the immediate job site. The present invention is capable of supporting multiple portable readers thus expediting the task of identifying various pieces of equipment prior to installation at a job site.

The present invention utilizes the basic technology for a passive circuit and reader as disclosed in U.S. Pat. No. 4,818,855 (the "'855 patent") relating to an identification system, and is incorporated herein by reference. The present invention calls for a passive circuit, of the type disclosed in the '855 patent, to be encapsulated in a hostile environment package and affixed to a piece of oilfield equipment. Each of the passive circuits includes a unique identification code stored in a read-only memory. The encapsulation utilized within the present invention is designed to withstand conditions encountered within the oilfield, including downhole well conditions. The encapsulated circuit is energized by a portable reader which transmits an electromagnetic field as disclosed in the '855 patent. The encapsulated circuit is tuned to the reader transmissions and transmits the identification code stored within memory in the encapsulated circuit thereby sending an identifying signal for the particular piece of oilfield equipment. The reader receives the coded transmissions from the encapsulated circuit and decodes the transmission to arrive at a unique identification number. The reader relays the circuit transmission to a central computer. The central computer receives the information from the reader and accesses a computer database which maintains information relating to the service history for various pieces of oilfield equipment oilfield equipment. The computer database may include information relating to the number of times a piece of pipe has been utilized in a well, the type of borehole environment and other factors which may relate to equipment reliability for the particular environment. It will be appreciated that the computer database would include information relating to the particular piece of equipment and various parameters relating to the use of the type of equipment, such as number of uses, date of last usage and special conditions encountered in each use. The particular format for the computer database is to be set by the user and may vary with each application or type of equipment. Based on a set of criteria for usage of the particular type of the equipment, the central computer determines whether the particular piece of equipment should be utilized in a particular job and what type of action is to be taken with respect to the equipment, i.e., to use it, take it out of service discard it, etc. The decision rules and usage criteria with regard to each type of equipment may be customized for the particular type of equipment by the user of the present invention. The action to be taken is transmitted back to the reader which visually displays this information to the user. The transmission of information between the reader and the central computer may be accomplished via electrical interconnection. Alternatively, the reader and the central computer may transmit and receive via an RF signal. Thus, the present invention may be used to identify and track oilfield tool usage away from the immediate job site.

BRIEF DESCRIPTION OF THE DRAWINGS

A better understanding of the present invention can be obtained when the detailed description of the preferred embodiments considered with the following drawings in which.

DETAILED DESCRIPTION OF THE PREFERRED EMBODIMENT

Figure 1:
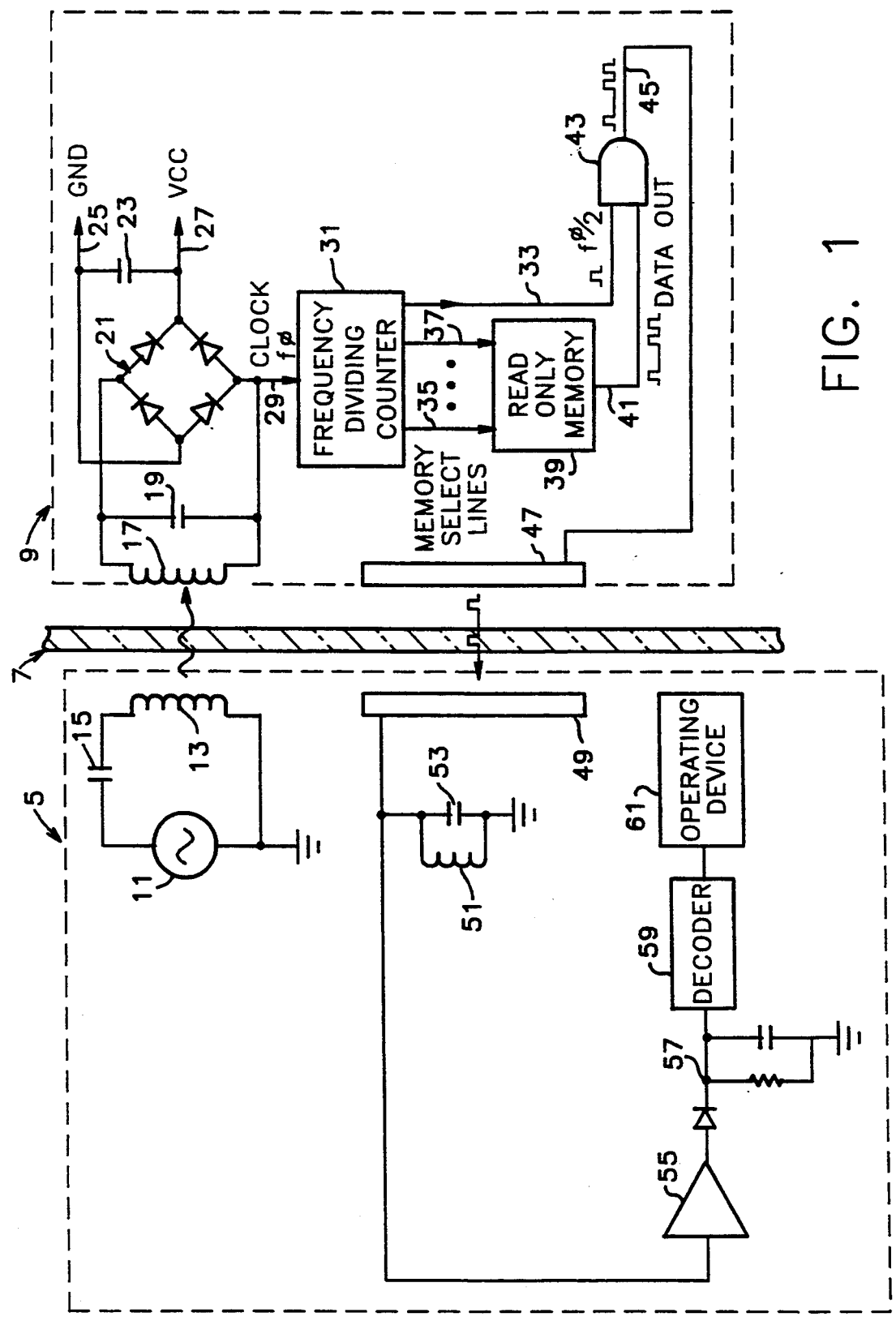
FIG. 1 is a schematic diagram of a passive circuit and reader of the type used within the present invention.

FIG. 1 illustrates a passive circuit 9 and portable reader 5 as utilized within the present invention. The reader 5 is comprised of an oscillator 11 designed to operate at a convenient frequency, such as 400 KHz, which is tuned by means of a variable capacitor 15 to coil antenna 13. The antenna 13 emits an electromagnetic field. The passive circuit 9 includes a coil 17 and capacitor 19 to form a tuned LC circuit which is tuned to the output of antenna 13. A full wave rectifier 21 and a filter capacitor 23 are connected to the tuned LC circuit to provide power to the passive circuit, designated $V_{cc}$ and GND. The full wave rectifier also provides a clock signal of frequency $f_0$ which is processed by a divider 31 to produce a signal of frequency $f_0/2$ on line 33. The signal from the frequency divider 31 is also used to address a multiplicity of memory select lines, e.g., 35 and 37. While only two memory select lines 35 and 37 are depicted in FIG. 1, it is contemplated that there exist a plurality of memory select lines in the present invention. The memory select lines 35 and 37 are used by the passive circuit 9 to drive a read-only memory (ROM) device 39. The ROM 39 is preprogrammed with a unique identification code which will be used to identify a particular piece of equipment. While FIG. 1 discloses a ROM device, the present invention contemplates the use of electrically erasable and programmable read only memory (EEPROM), optically erasable and programmable memory and other technology. The ROM 39 outputs an address on line 41 which is connected to AND gate 43 along with signal $f_0/2$ on line 33. The output of AND gate 43 is a square wave signal on line 45. Line 45 is connected to an electrostatic antenna 47 which transmits the coded information.

The reader 5 also includes a tuned receiving antenna 49. The antenna is tuned by means of an LC circuit utilizing coil 51 and capacitor 53. The antenna 49 is used to receive the coded information output of output of the electrostatic antenna 47. The antenna 49 is connected to an operational amplifier 55. The pulses are detected by means of an RC circuit 57 and decoded by means of detector 59. A reader identification code and the identification code output of detector 59 is then transmitted to a central computer (not shown). The identification code information may be transmitted to the central computer by means of an electrical conductor or may be transmitted by means of an RF carrier. Further, the decoded output from decoder 59 may be directly displayed on the reader 5 (FIG. 6) for verification purposes. There exist a number of variations to the reader and passive circuit described in FIG. 1 as exemplified in the '855 patent. It is contemplated that any variant in the above circuits are within the scope of the invention.

Figure 2:
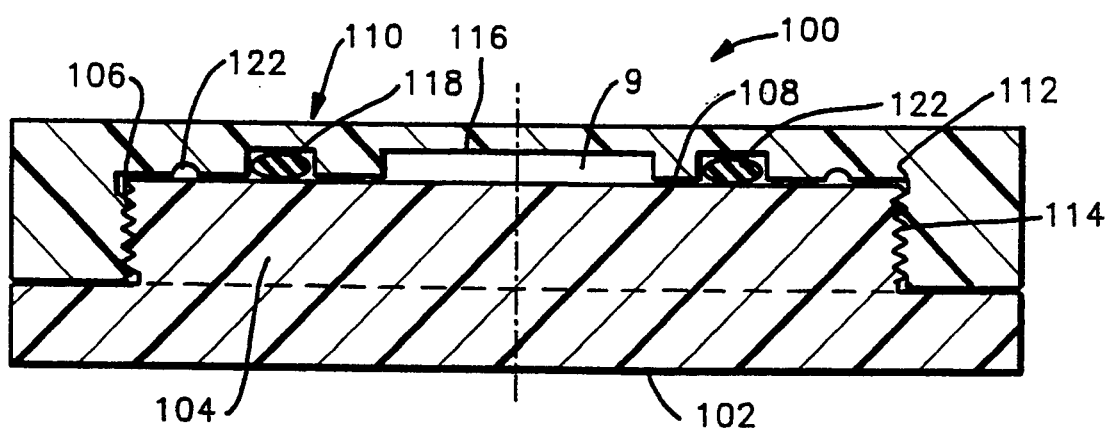
FIG. 2 is a sectional view of a capsule for the passive circuit of the present invention.

It will be appreciated that the passive circuit 9 will require some degree of protection given the intended use. The passive circuit must be protected against conditions encountered in downhole applications as well as surface applications such as rain, mud, snow, etc. Accordingly, the present invention contemplates the encapsulation of the passive circuit 9 which will permit the passive circuit to receive and transmit signals thereby carrying out its designed function while protecting the circuit. FIG. 2 is a sectional view of one embodiment of a capsule used to protect the passive circuit 9. The capsule 100 is generally circular in cross section and is comprised of two elements. The first element is a circular chip base 102 having a smaller concentric chip platform 104. The chip platform 104 has an external thread 106 machined on the diameter of the platform 104. The chip platform 104 also has a generally flat circular face 108. The second element to capsule 100 is a chip cover 110. The chip cover 110 is also generally circular in cross section having approximately the same diameter as that of chip base 102. The chip cover 110 has a blind counter bore 112 therein. The counterbore 112 diameter is internally threaded and adapted to mate with the external thread 106 on chip platform 104. The chip cover 110 also has a second counterbore 116. The second counterbore 116 is of sufficient depth to provide clearance for passive circuit chip 9 when the chip cover 110 is assembled onto the chip base 102. Further, the chip cover 110 includes two concentric grooves on the internal face of counterbore 112. The first groove is a conventional O-ring groove 118 which is adapted to receive an elastomeric O-ring 120. The O-ring 120 is compressed between the chip cover 110 and the chip platform 104 when the chip cover 110 is assembled with the chip base 102 thereby sealing the passive circuit chip 9 from the external environment. The O-ring 120 operates as a secondary seal to prevent external contaminates from reaching passive circuit chip 9. The chip cover 110 also has an outer circular groove 122. In the present invention, it is contemplated that groove 122 would be filled with an elastomeric sealant which would seal between the chip cover 110 and the chip platform 104. It is contemplated that the sealant used would be capable of withstanding high downhole temperatures and pressures as well as the corrosive borehole environment. While it is contemplated that the chip cover 110 and chip base 102 may be disassembled to replace passive circuit 9, the current invention also contemplates the application of a permanent epoxy to groove 122 to create a permanent seal between chip platform 104 and chip cover 110. The seal formed therebetween acts as a primary seal for the capsule 100.

Figure 3A:
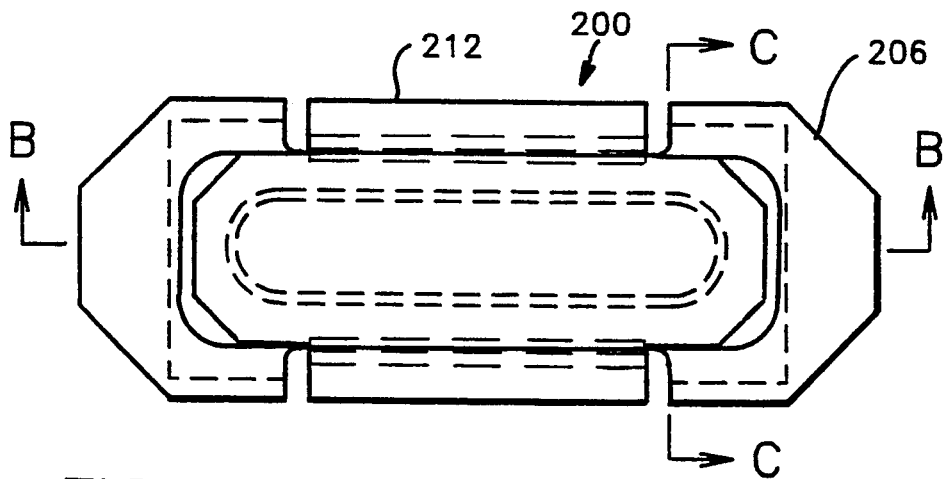
FIG. 3A is a top elevation of an alternative embodiment of a capsule for the passive circuit.
Figure 3B:
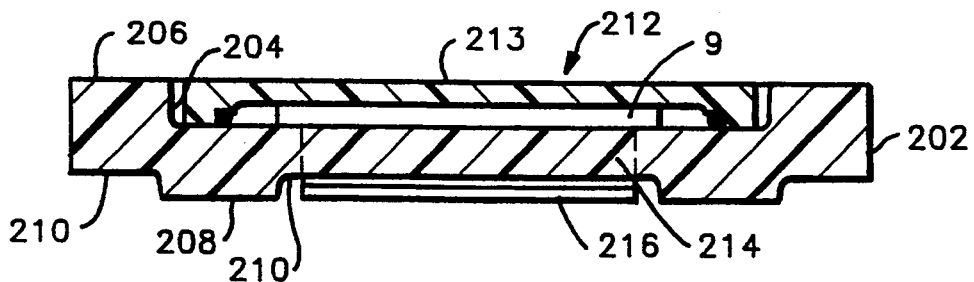
FIG. 3B is a sectional view of the alternative embodiment of a capsule as set forth in FIG. 3A.
Figure 3C:
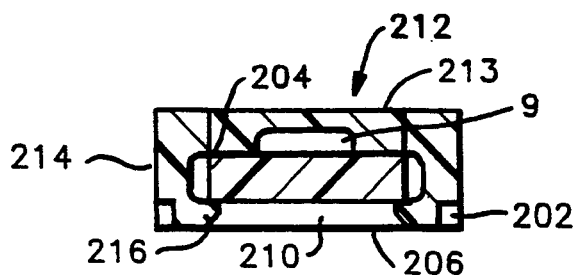
FIG. 3C is a sectional view of the alternative embodiment of a capsule as set forth in FIG. 3A.

FIG. 3A is an alternate embodiment of a capsule 200. In FIG. 3A, capsule 200 is generally rectangular in shape and is comprised of a chip base 202, having a rectangular pocket 204 in its top face 206 (FIG. 3B). Referring to FIG. 3B, the chip base 202 also has a bottom face 208, in which a relief area 210 has been formed or machined. The alternative embodiment of the capsule 200 includes a chip cover 212 which is adapted to mate with the chip base 202. The chip cover 212 has a flat top surface 213 and at least two cover arms 214 which extend down past the top surface of the cover 212 (FIG. 3C). Referring to FIG. 3C, a detent latch 216 is located at the distal end of the cover arm 214. When the chip cover 212 is assembled to the chip base 202, the cover arms 214 fit over the edge of the chip base 202 and the cover detent latches 216 latch onto the bottom side of the chip base 202 about the chip base 202 relief area 210. The chip cover 212 is retained on the chip base by the detent latches 216. The passive circuit chip 9 is retained between the chip base 202 and the chip cover 212 when fully assembled. The capsule may be further sealed by the use of a commercially available elastomeric sealant applied to the bottom of the chip cover 212 prior to assembly.

Both capsules 100 and 200 may be manufactured from a suitable non-ferrous metal or suitable thermoplastic.

Figure 4B:
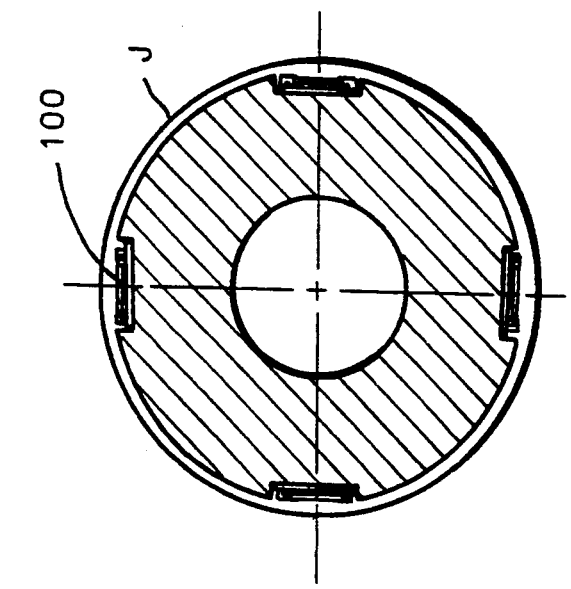
FIGS. 4A–4D illustrate the capsule of FIG. 1 installed on downhole oilfield equipment.
Figure 4D:
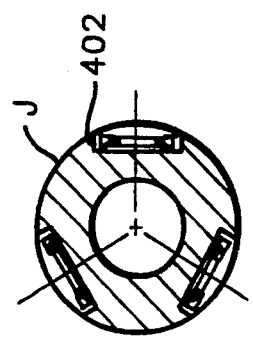
Figure 4A:
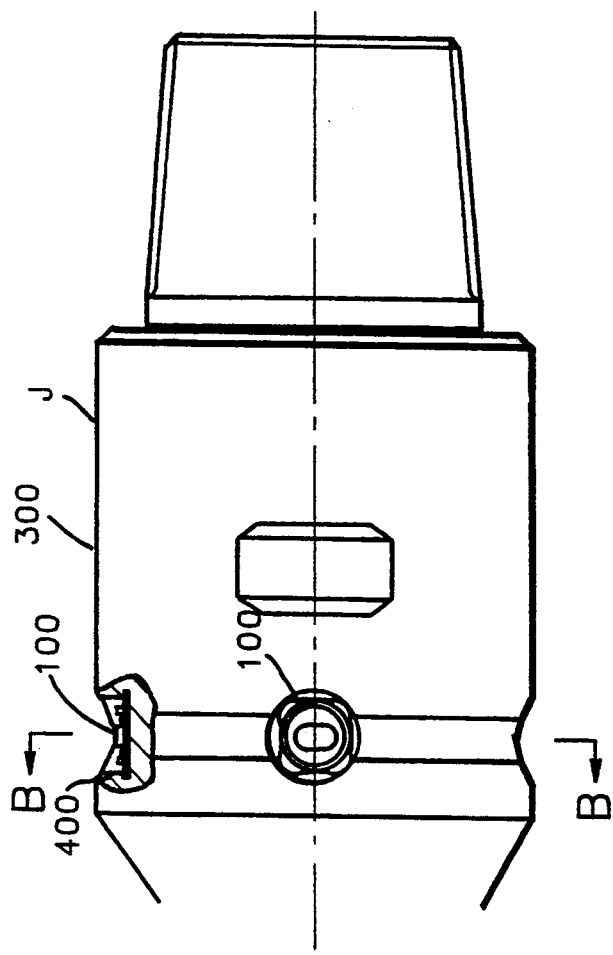
Figure 4C:
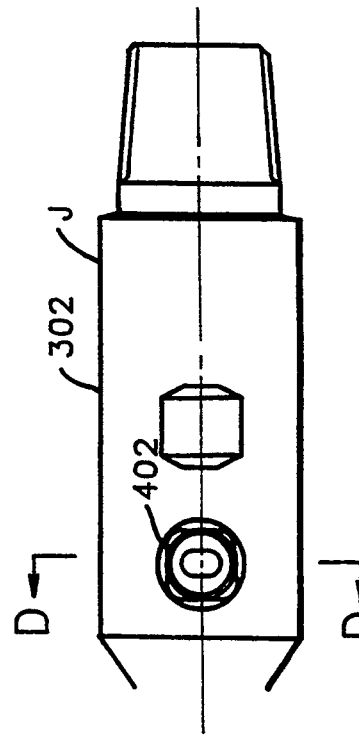

FIGS. 4A, 4B, 4C and 4D illustrate the mounting of multiple passive circuit chips 9 within capsules 100 on a typical pipe tool joint J. In FIG. 4A, a capsule 100 of the type described in FIG. 2 above, is mounted in the relief area of a 5½" full tool joint J having dimensions in compliance with American Petroleum Institute (API) standards. A blind hole 400 is drilled or milled into the tool joint pin end 300 to provide for the mounting of capsule 100 therein. Multiple capsules 100 are mounted on the periphery of the pin end 300 as illustrated in sectional view FIG. 4B. The capsules may be retained within hole 400 by a suitable adhesive or other mechanical means. The purpose behind the mounting of multiple capsules 100 is to decrease the degree to which the readers 5 and passive circuits 9 are directionally sensitive. Thus, a person utilizing a reader 5 will not spend time attempting to visually determine where the capsule 100 is located on the tool joint J. In FIG. 4C a capsule 100 is shown as mounted in a hole 402 on the pin end 302 of tool joint J. In FIG. 4C, the tool joint is manufactured according to API standard NC26. In FIG. 4D, three capsules 100 are shown as being mounted equidistant to each other on the periphery of the pin end 302. Again, multiple capsules 100 are used to decrease directional sensitivity.

Figure 5B:
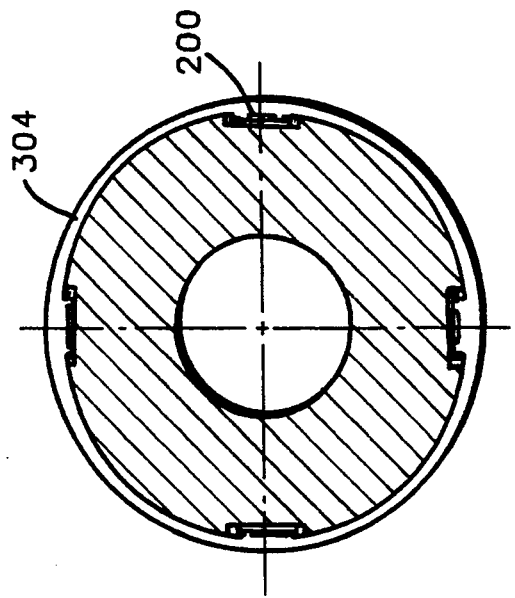
FIG. 5A–5D illustrate the capsule of FIG. 2 installed on a downhole of equipment.
Figure 5D:
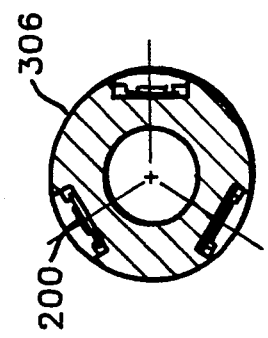
Figure 5A:
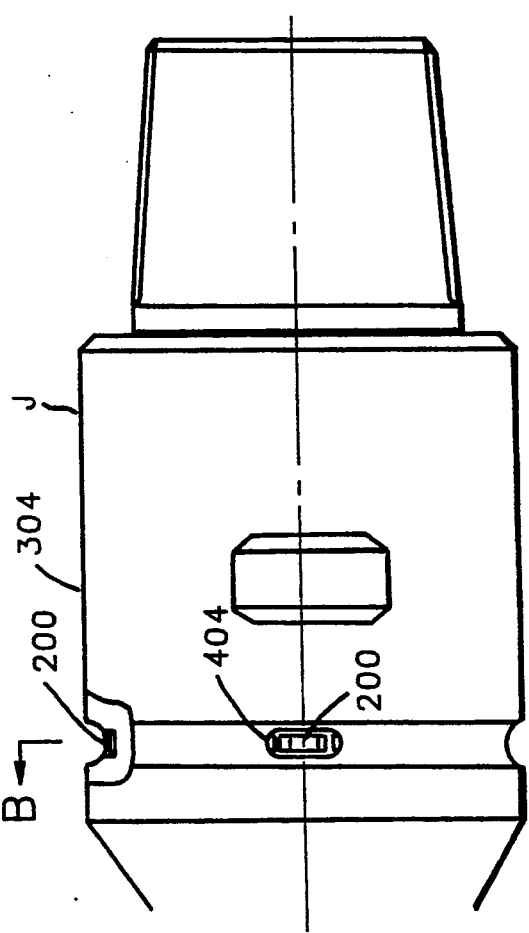
Figure 5C:
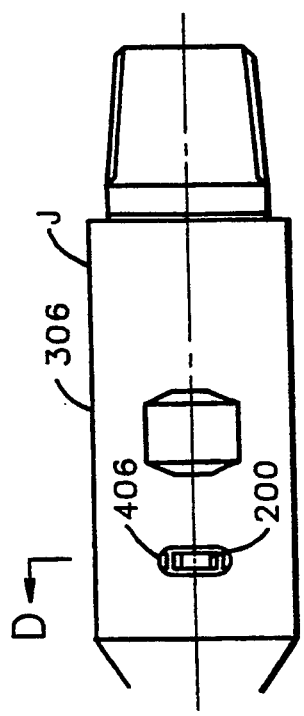

FIGS. 5A, 5B, 5C and 5D illustrate the use of the alternate chip capsule 200 embodiment on the very same tool joints J. In FIG. 5A a capsule 200 is shown as being mounted on an API 5½" tool joint J. A slot 404 is milled in the relief area of the tool joint J pin end 304 to provide for the mounting of capsule 200 therein. As seen is FIG. 5B, multiple capsules are mounted on the pin end 304 to improve response and decrease directional sensitivity. Similarly, in FIG. 5C a capsule 200 is shown as mounted on an API NC26 tool joint J. A slot 406 is milled on the pin end 306 of tool joint J. As shown in FIG. 5D, multiple slots 406 are provided for the mounting of multiple capsules 200.

FIGS. 4A–4D and 5A–5D are both directed to the mounting of capsules 100 and 200 on tool joints. However, it is contemplated that similar mounting techniques may be utilized to mount capsules 100 and 200 and various types of surface and downhole equipment. Thus, application of the present invention is not limited to downhole oilfield equipment.

Figure 6:
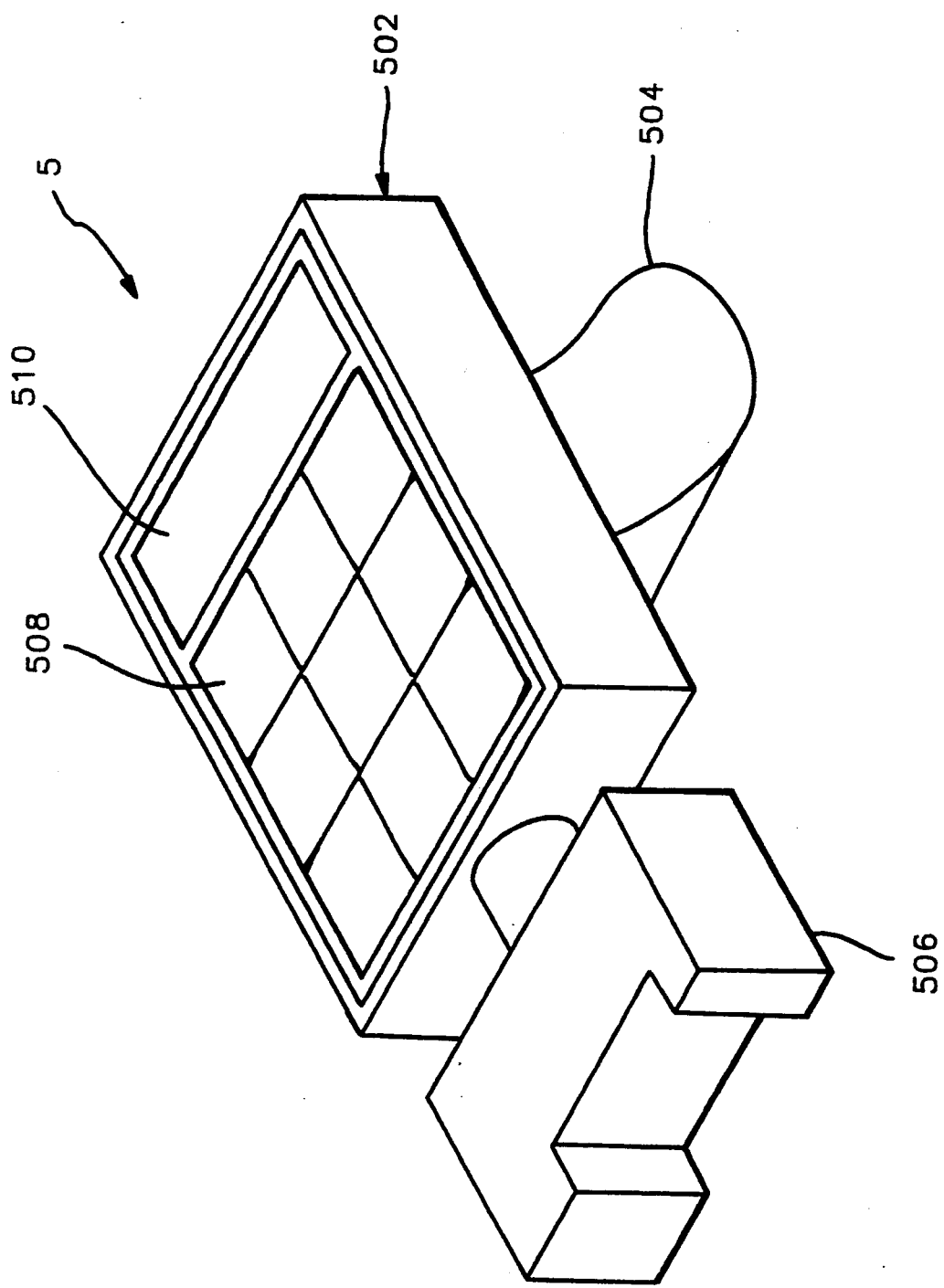
FIG. 6 is a view of the reader device.
Figure 8:
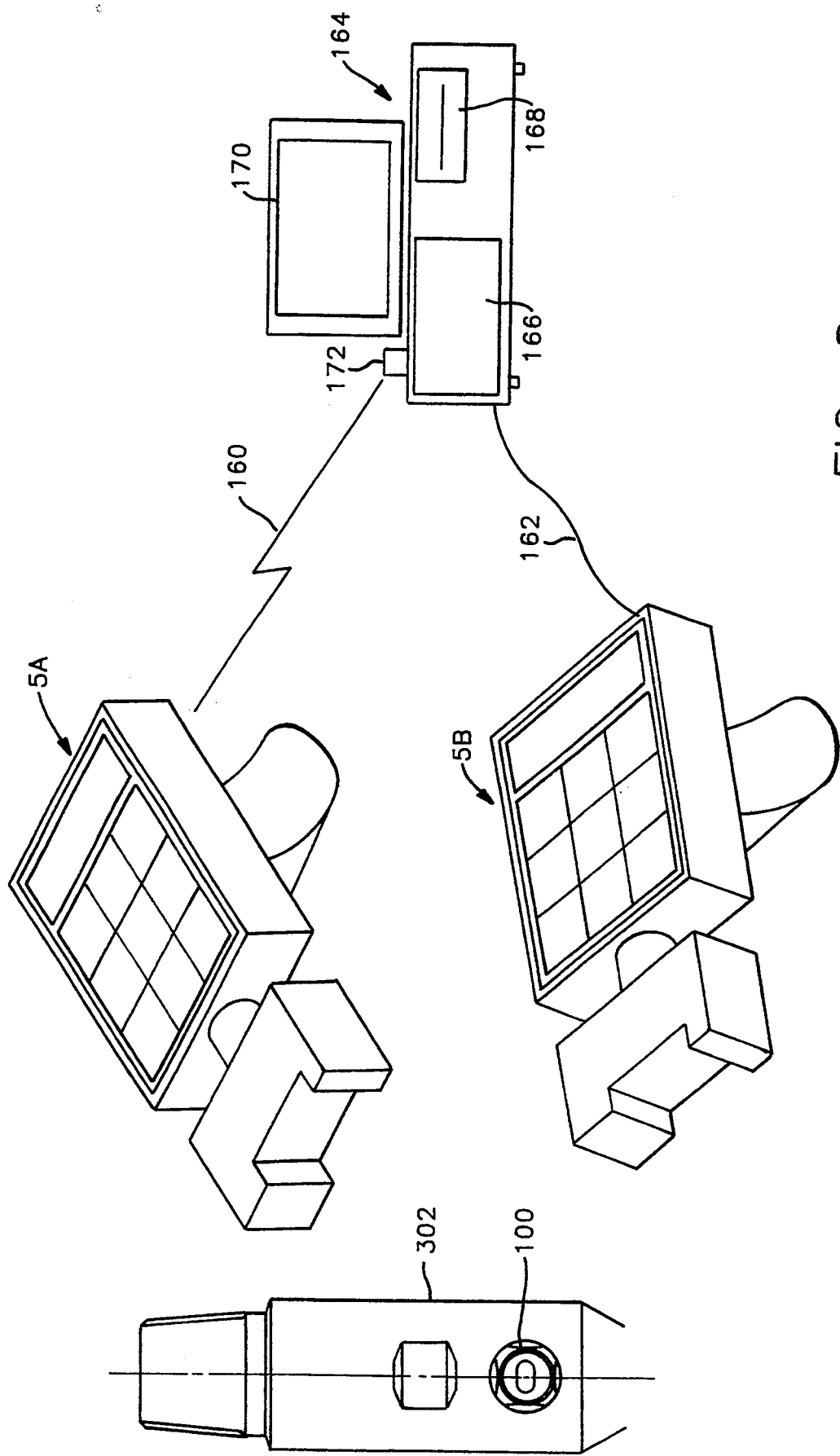
FIG. 8 is a diagram of the components of the preferred embodiments of the present invention.

FIG. 6 is a schematic of one embodiment of a reader 5. The reader 5 includes a central housing 502 which includes a battery power supply (not shown) and the circuit generally described in FIG. 1. The reader also includes a grip 504 for ease of use by an operator. The electrostatic antenna 13 (FIG. 1) is mounted in an antenna bracket 506 external to the reader housing 502 and is electrically connected with the remainder of the circuitry. Also included in the central housing is a radio frequency link 160 (not shown) and a microprocessor (not shown) to provide for communications to a central computer (not shown) by means of a radio frequency transmissions. Alternatively, the reader 5 may be electrically connected to the central computer by means of a conductor 162 (FIG. 8). The microprocessor is used to control communications and to decode and display instructions issued by the central computer 164 (FIG. 8). The microprocessor is connected to a function pad 508, which may be used to communicate with the central computer. Further, the reader 5 microprocessor is connected to a liquid crystal display unit 510 which may be used to display information from the central computer. It is contemplated that other reader 5 embodiments capable of carrying out the same functions are within the scope of the invention. Further, it is contemplated that multiple readers 5 may be in communication with a central computer, thus permitting several persons to identify various pieces of equipment simultaneously.

Figure 7A:
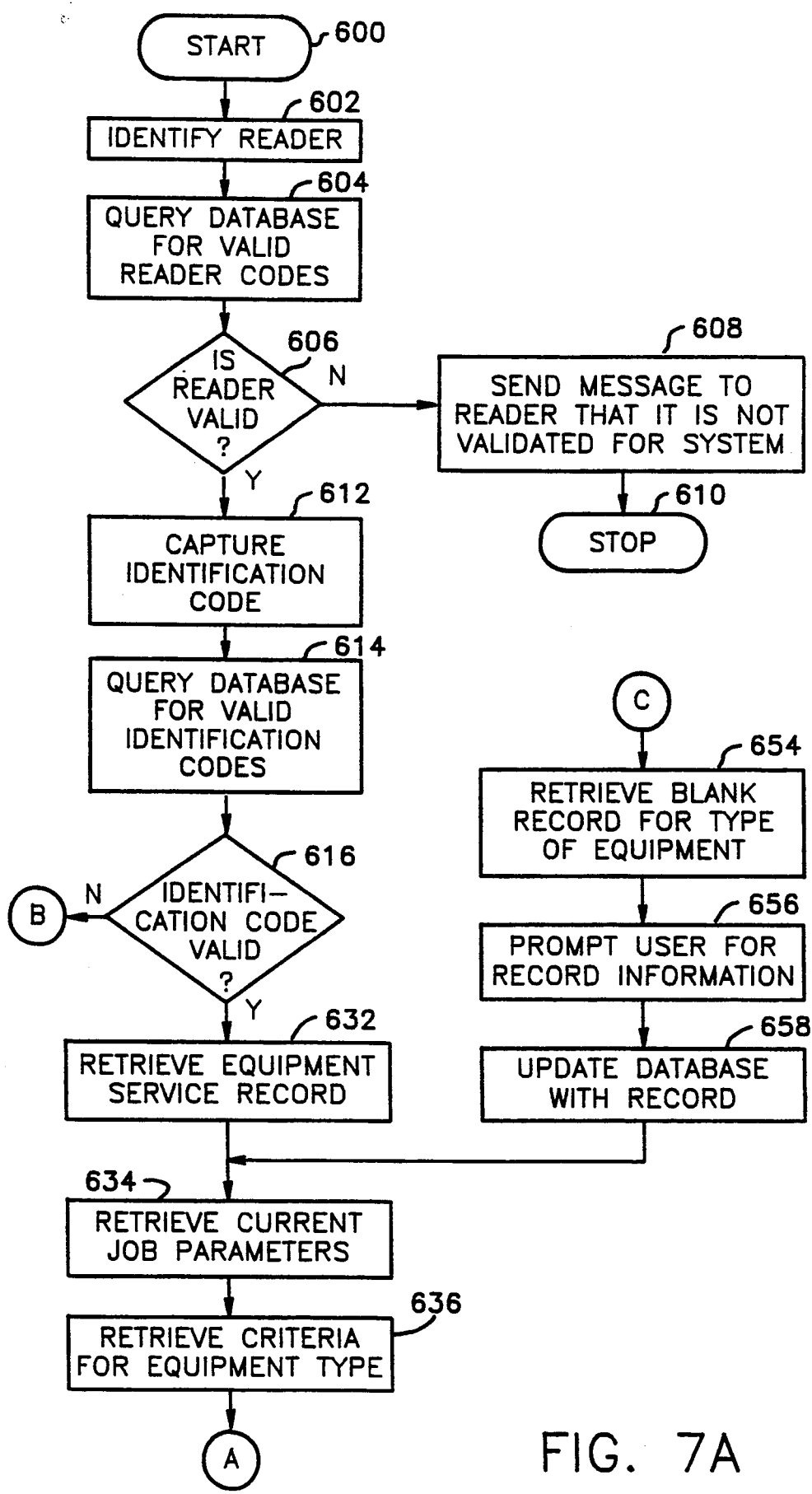
FIGS. 7A, 7B and 7C are a flow chart illustrating an exemplary set of rules for determining continued usage of a piece of oilfield equipment.
Figure 7B:
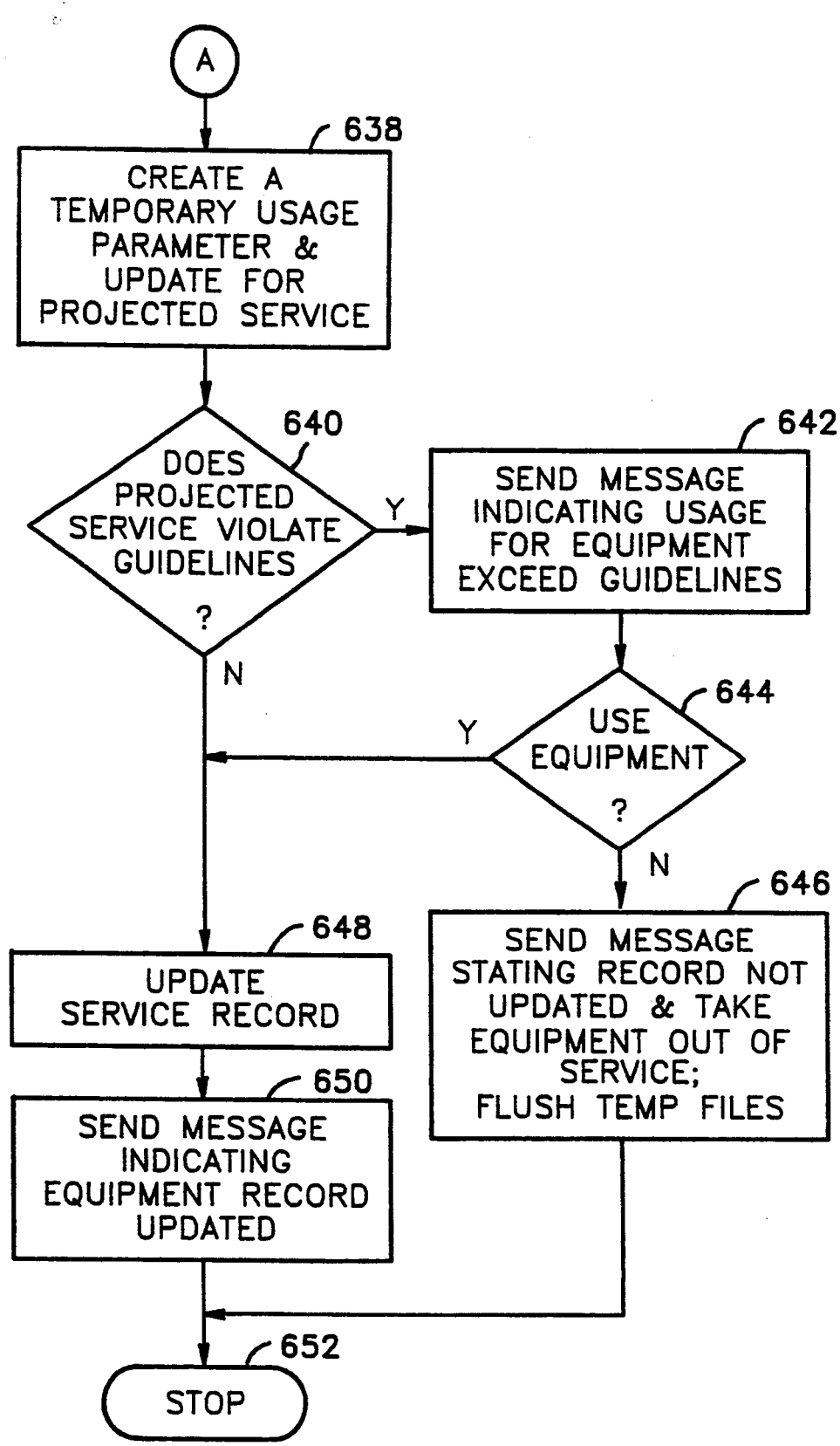
Figure 7C:
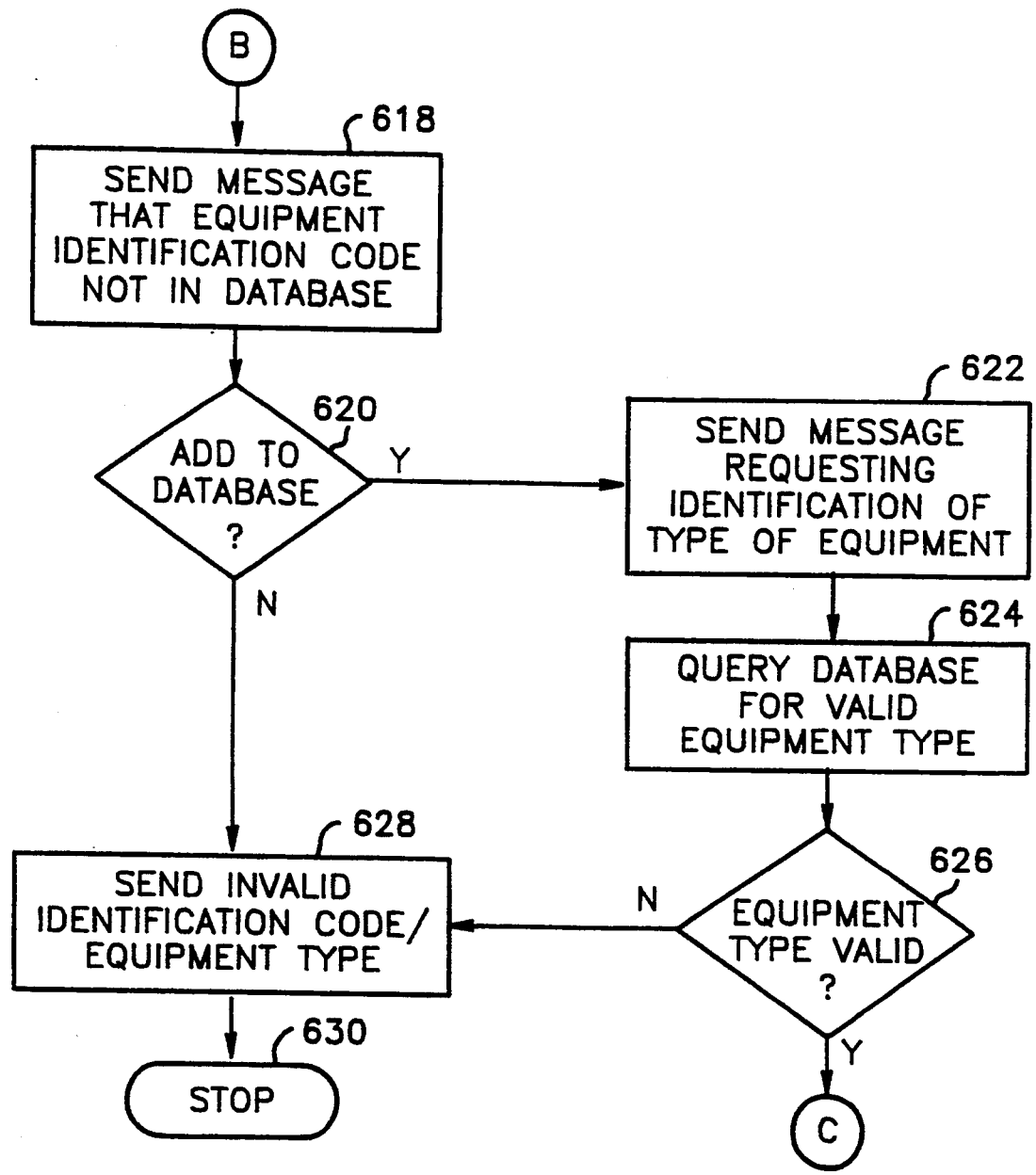

FIG. 7 is a flow chart of one embodiment of a oilfield equipment database and the criteria evaluation carried out by the central computer. It is understood that many of the functions which address communications and control are not a part of the flow chart. Processing begins at step 600 wherein a reader record is received by the central computer system. Control transfers to step 602 wherein the system identifies the readers sending the message. Control transfers to step 604 wherein the system queries the equipment data base for valid reader codes. Control transfers to step 606 wherein the system determines whether the reader code received is a valid reader code for the database. If not a valid reader code, control transfers to step 608 wherein the system sends a message to the reader that it is not validated for the system. Control transfers to step 610 which stops the processing of the particular update. If the reader code is valid, control transfers to step 612 wherein the central computer captures the identification code read from the piece of oilfield equipment. Control transfers to step 614 wherein the system queries the database for valid identification codes for oilfield equipment. Control transfers to step 616 wherein the system determines whether the identification code read is valid. If not valid, control transfers to step 618 wherein the system sends a message to the reader that the equipment identification code is not in the database. Control transfers to step 620 wherein the computer queries whether the operator wishes to add the equipment to the database. If the operator responds via reader yes, control transfers to step 622 wherein the computer sends a message requesting identification of the particular type of equipment to be sent by the operator via the reader. Upon receiving identification type control transfers to step 624 wherein the system queries the database to determine whether the equipment type specified by the user is a valid equipment type for the particular database. If no identification type code is received the system will time out and cease processing the transmission. Control transfers to step 626 wherein the system determines whether the equipment type is valid. If not valid, control transfers to step 628. If in step 620 the operator determines that the equipment identification code is not to be added to the database, control transfers to step 628. In step 628 the system sends an invalid identification code or equipment type message to the reader. Control transfers to step 630 wherein the processing of the current read ends. If in step 616 it is determined that the data identification code is valid, control transfers to step 632 wherein the system retrieves the equipment service record for the piece of equipment corresponding to the identification code read. Control transfers to step 634 wherein the system retrieves current job parameters. The job parameters are used to describe conditions which will be encountered in the current job. The conditions could include the existence of hydrogen sulfide gas, which requires particular types of stainless steels, pipe diameters or projected well depth and time in hole. Control transfers to step 636 wherein the system retrieves the criteria for the particular equipment type. This criteria will vary with each type of equipment and may be customized for each job. For example, tool joints which have been used in hydrogen sulfide wells may have a lower limit for reuse then tool joints not used under such conditions. Further, it is contemplated that individual types of equipment will have different criteria for evaluation of reuse and each will be stored within the database. Control transfers to step 638 wherein the system creates a temporary usage parameter file and updates the service record of the piece of equipment with projected service in the current job. Control transfers to step 640 wherein the system determines whether the projected service violates the guidelines for the type of equipment. If yes, control transfers to steps 642 wherein the system sends a message indicating usage for the particular piece of equipment exceeds the recommend guidelines. Control transfers to step 614 wherein the computer queries the operator whether the operator still wishes to use the particular piece of equipment. If no, control transfers to step 646 wherein the system sends a message stating that the equipment record was not updated and recommending that the equipment be taken out of service. Further, the computer will flush any temporary files. If it is determined in step 640 that the rejected services do not violate the guidelines for the particular type of equipment, control transfers to step 648 wherein the service record for the particular piece of equipment is updated and posted to the database. The service record may be updated to a degree by the computer with regard to common job information. It will be appreciated that there exists common information for all pieces of oilfield equipment, such as vendor, date, site location, customer, etc. Further, the user may enter additional information from the remote reader 5 which may be added to the record. Control transfers to step 650 wherein the system sends a message to the reader indicating that the equipment record was updated. Control transfers to step 652 in which the processing of the identification code. If in step 626 it is determined that the equipment type which the operator was attempting to add to the database is valid control transfers to step 654 wherein the system retrieves a blank service record for the type of equipment. Control transfers to step 656 wherein the computer will prompt the user for the necessary record information to create a record for the particular type of equipment. Control transfers to step 658 wherein the system updates the database with the newly built record. Control then transfers to step 634 wherein the computer will update the record as if it were already a member of the database.

FIG. 8 is a diagram of the preferred embodiment of the present invention. In FIG. 8, capsule 100, having circuit 9 therein, is shown as being mounted on tool joint 302. Two readers 5A and 5B are shown in close proximity to tool joint 302. A conventional personal computer system 164 is shown in FIG. 8, having a hard disk subsystem 166, a floppy disk subsystem 168 and a video monitor. It will be appreciated that the computer 164 would most probably include a keyboard (not shown) for local input to the computer 164. Reader 5A is shown as being in signal communications with computer 164 by means of a radio frequency carrier signal link 160. A reader of the type depicted in reader 5A would include a radio transmitter/receiver for sending information to and receiving information from the computer 164. The computer 164 further includes a radio frequency transmitter and receiver link 172 which is interfaced to computer 164 to permit computer 164 to receive and transmit data from and to reader 5A. Reader 5B is interfaced to computer 164 by means of a conventional electrical conductor 162. It will be appreciated that the use of a radio frequency carrier or an electrical conductor to transmit data to and receive data from a computer are well known in the art.

It is understood that other methods having the same or similar functionality are included within the scope of the present invention.

The description given here is intended to illustrate the preferred embodiment of this invention. It is possible to make various changes to the details of the apparatus without departing from this invention. It is intended that all such variations be included within the following claims.

We claim:

1. An interactive apparatus for identifying equipment and maintaining usage histories for a plurality of items, the apparatus comprising:

(a) a portable passive circuit for storing and transmitting a unique identification code corresponding to an item, said circuit comprising a first coupling means for receiving an electromagnetic signal of a predetermined frequency, a power means electrically connected to said first coupling means for providing power to said circuit, means for generating a unique identification code in response to activation of said power means, said unique identification code corresponding to said item, and a second coupling means for transmitting said identification code by means of an electromagnetic signal;

(b) means for encapsulating said passive circuit;

(c) means for affixing said encapsulated circuit to said item;

(d) a central computer, said computer adapted for interactively receiving and processing item identification and usage data, comprising:
  means for transmitting data to and receiving data from a reader means, said data including said unique identification code generated by said encapsulated passive circuit, said identification code corresponding to the item,
  means for storing and retrieving a plurality of usage records for a plurality of items, each of said usage records corresponding to an individual item and said unique identification code, and
  means for updating said usage records with said item current usage information;
(e) a portable reader means for identifying said items, said reader means comprising:
  means for transmitting an electromagnetic signal of a predetermined frequency, said signal being tuned to said passive circuit first coupling means,
  means for receiving and decoding said electromagnetic signal generated by said passive circuit, said receiving means being tuned to said passive circuit second coupling means,
  means for entering current usage information for said item into said central computer,
  means for transmitting data to and retrieving data from said central computer, said data including said unique identification code, said means corresponding to said central computer transmitting and receiving means,
  means for displaying said usage information entered in said reader or retrieved from said central computer,
said central computer further including:
  means for storing and retrieving predetermined recommended usage criteria for said equipment;
  means for updating said usage records with said current usage information:
  means for determining whether said updated usage record exceeds said predetermined recommended usage criteria for said equipment; and
  means for notifying said reader means where said temporarily updated usage record exceeds said recommended usage criteria.

2. The apparatus of claim 1, wherein said means for transmitting data to and receiving data from said reader means includes an electrical conductor.

3. The apparatus of claim 1, wherein said means for transmitting data to and receiving data from said reader means includes a radio frequency signal.

4. The apparatus of claim 1, wherein said means for interactively entering current usage information for said item includes a keypad on said reader means.

5. The apparatus of claim 1, wherein said reader means for retrieving data from said central computer includes means for retrieving said usage records.

* * * * *